Dec. 29, 1959   F. R. SWANSON ET AL   2,918,850
MACHINE TOOL
Filed March 10, 1958   9 Sheets-Sheet 9

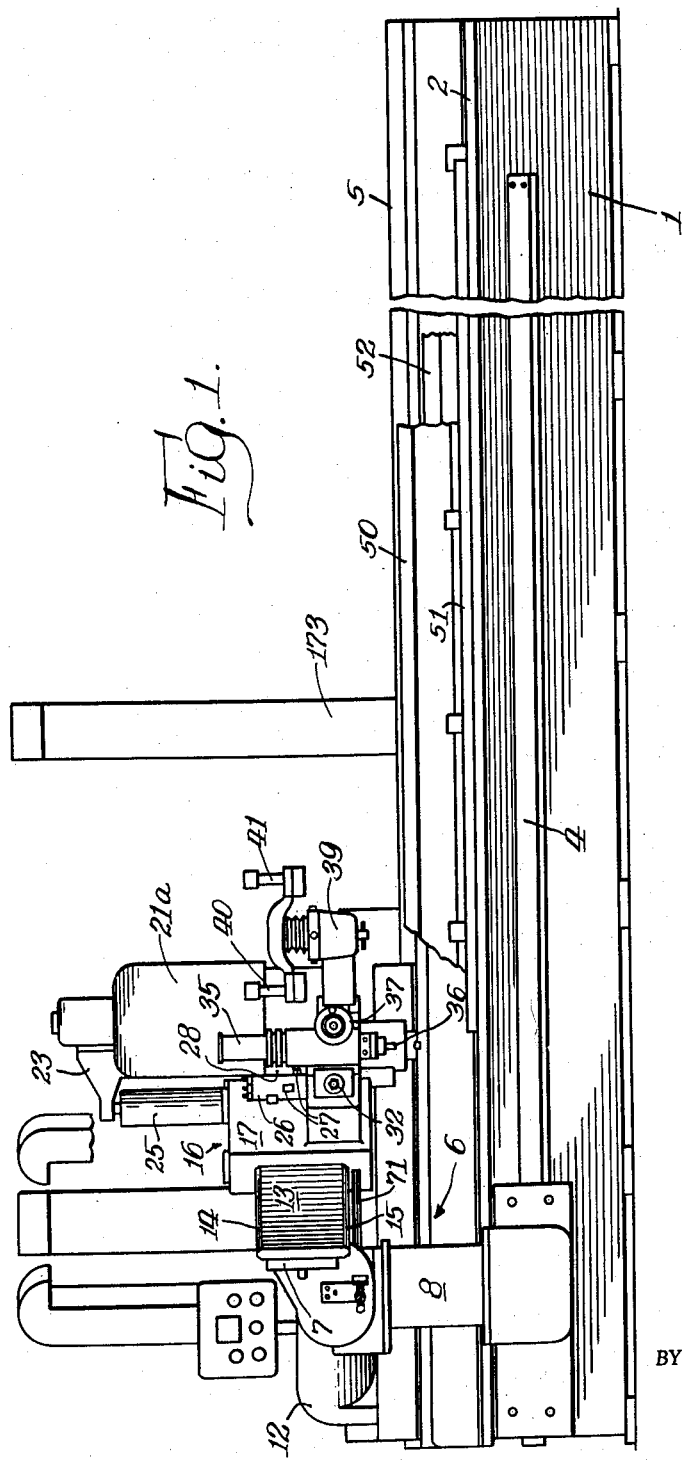

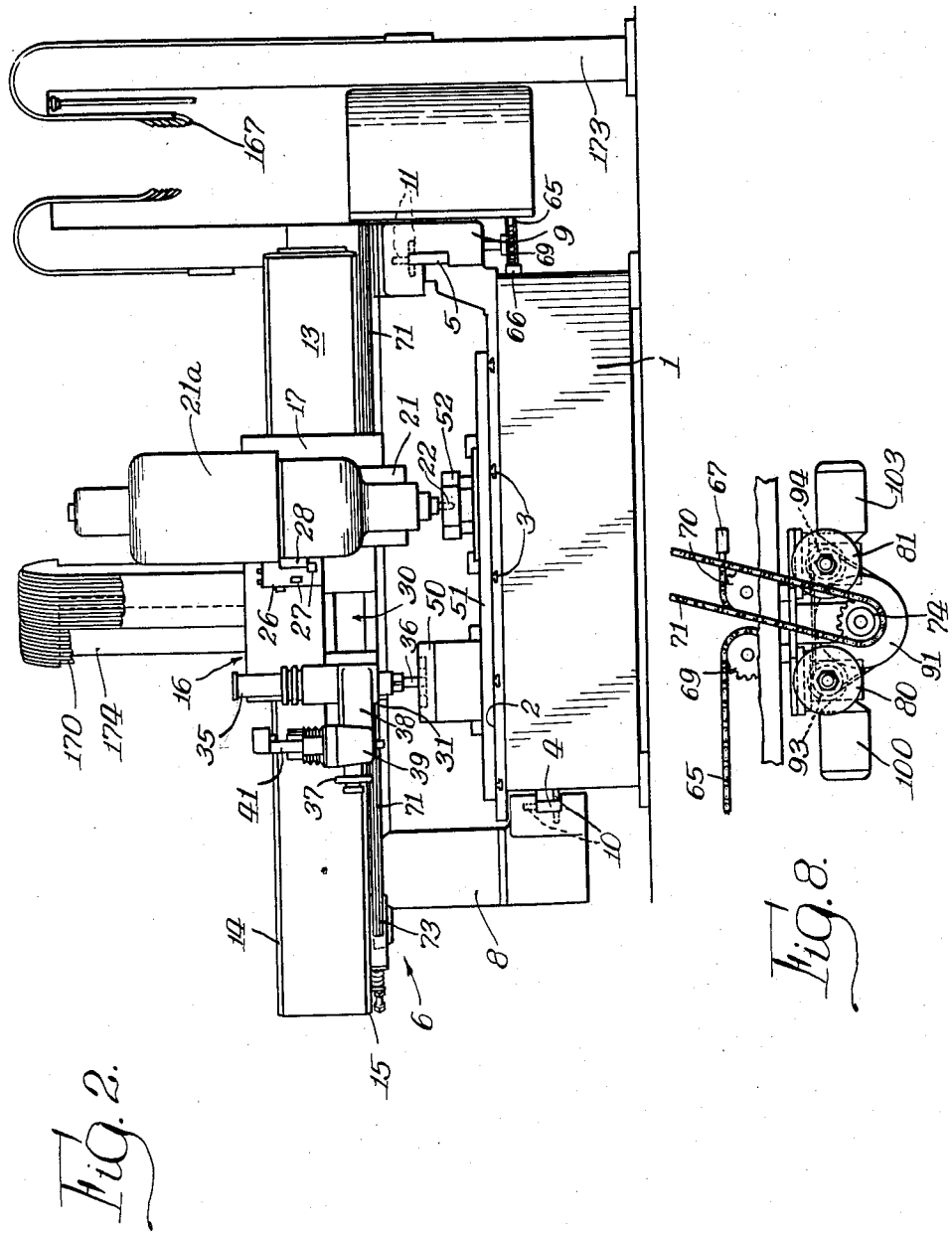

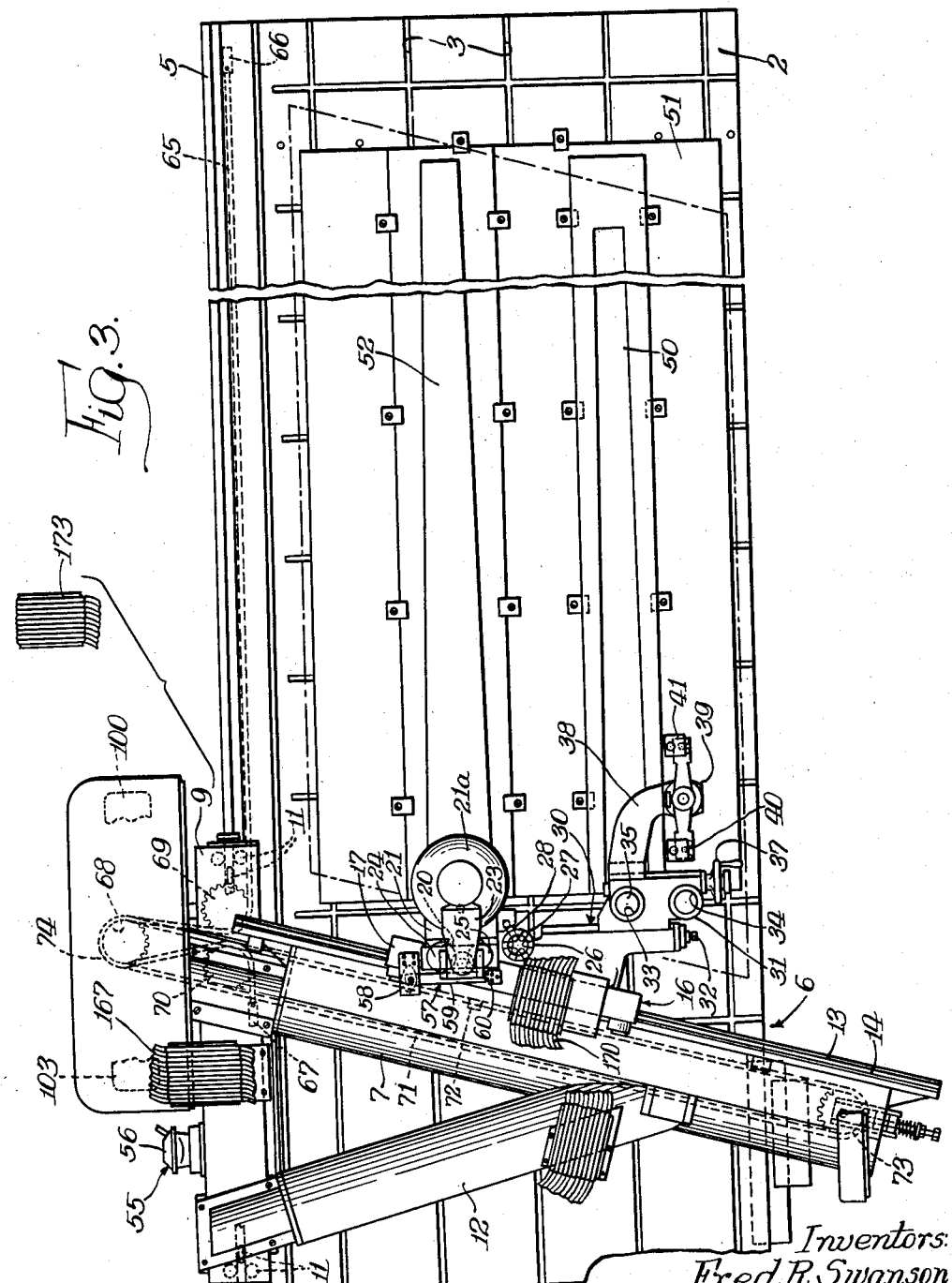

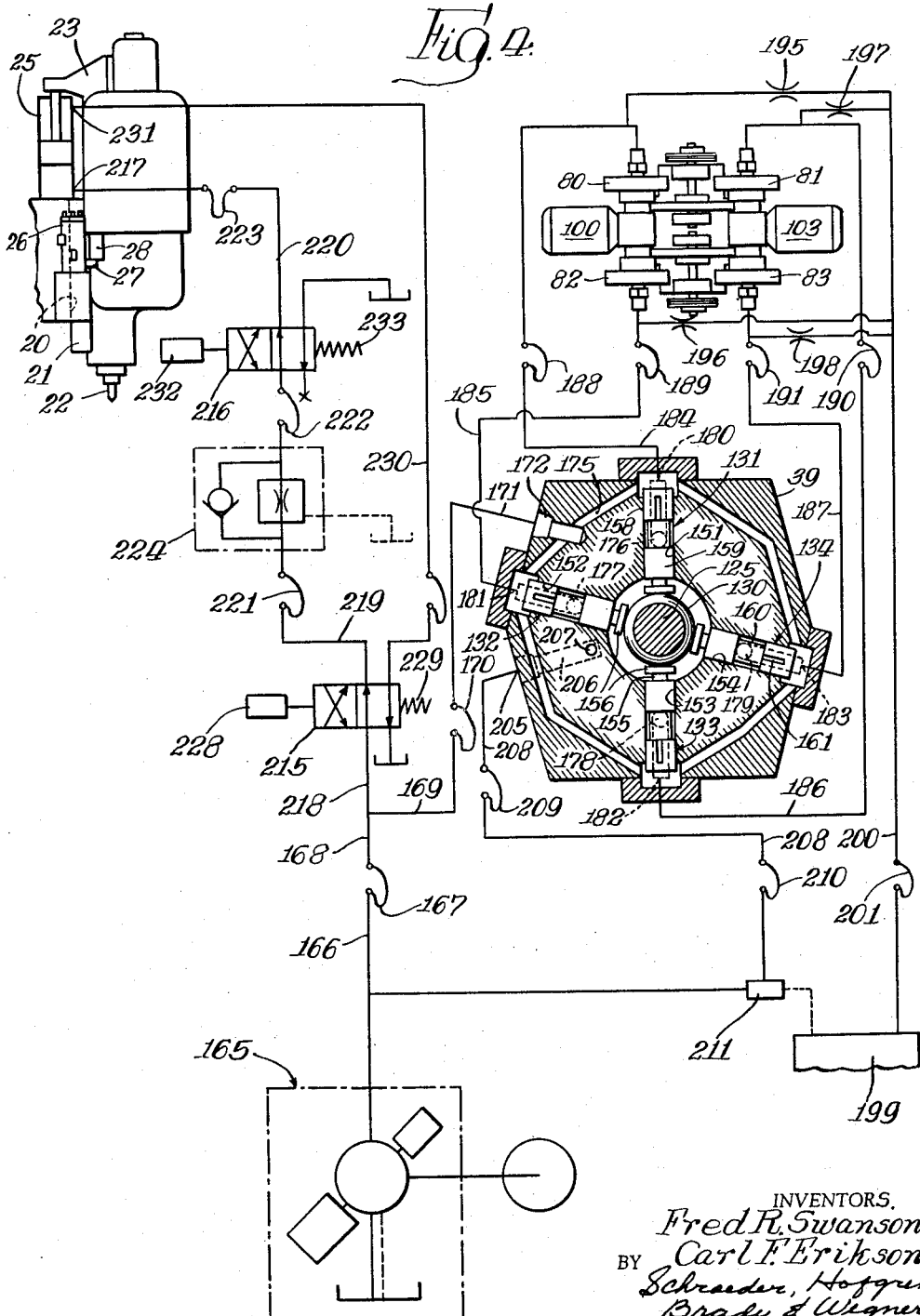

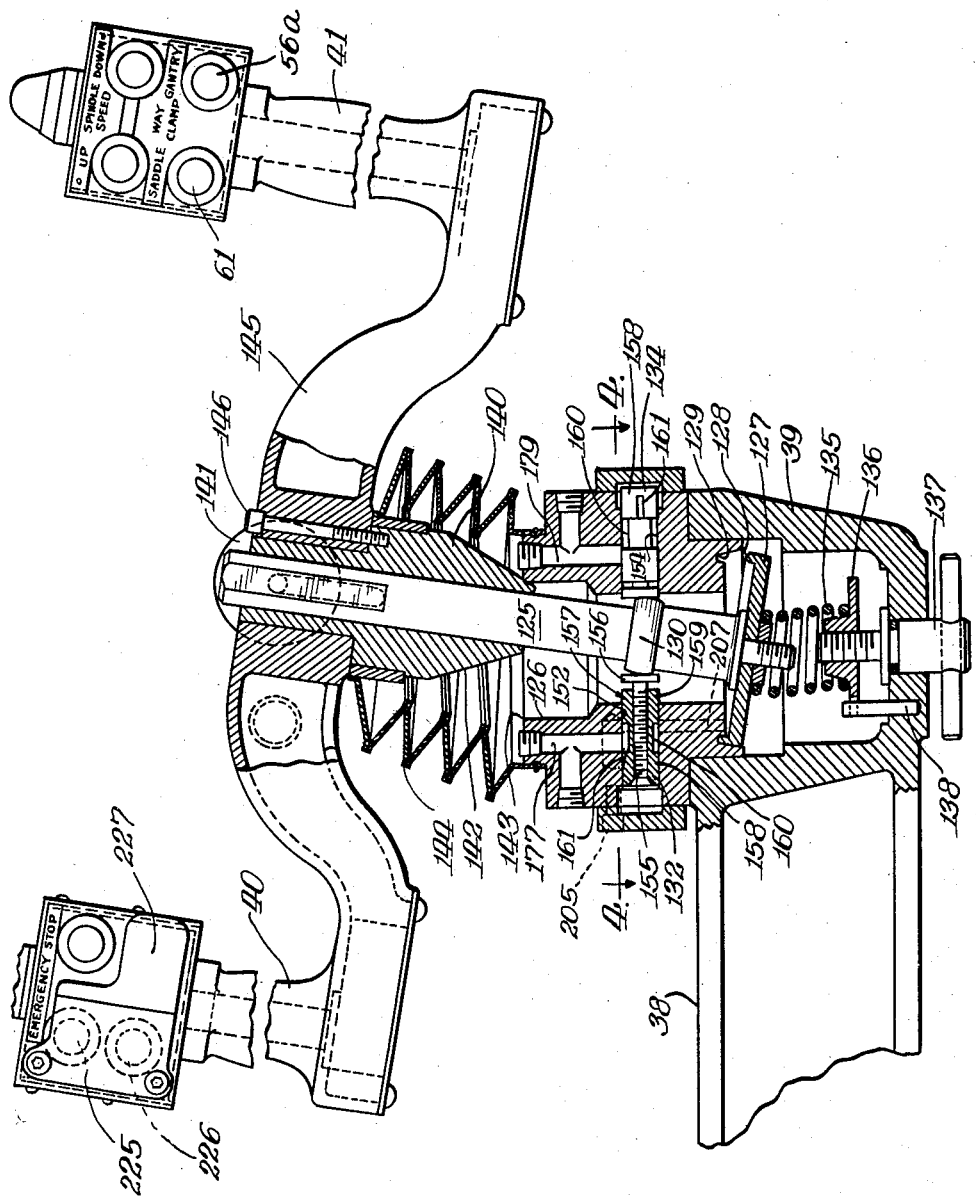

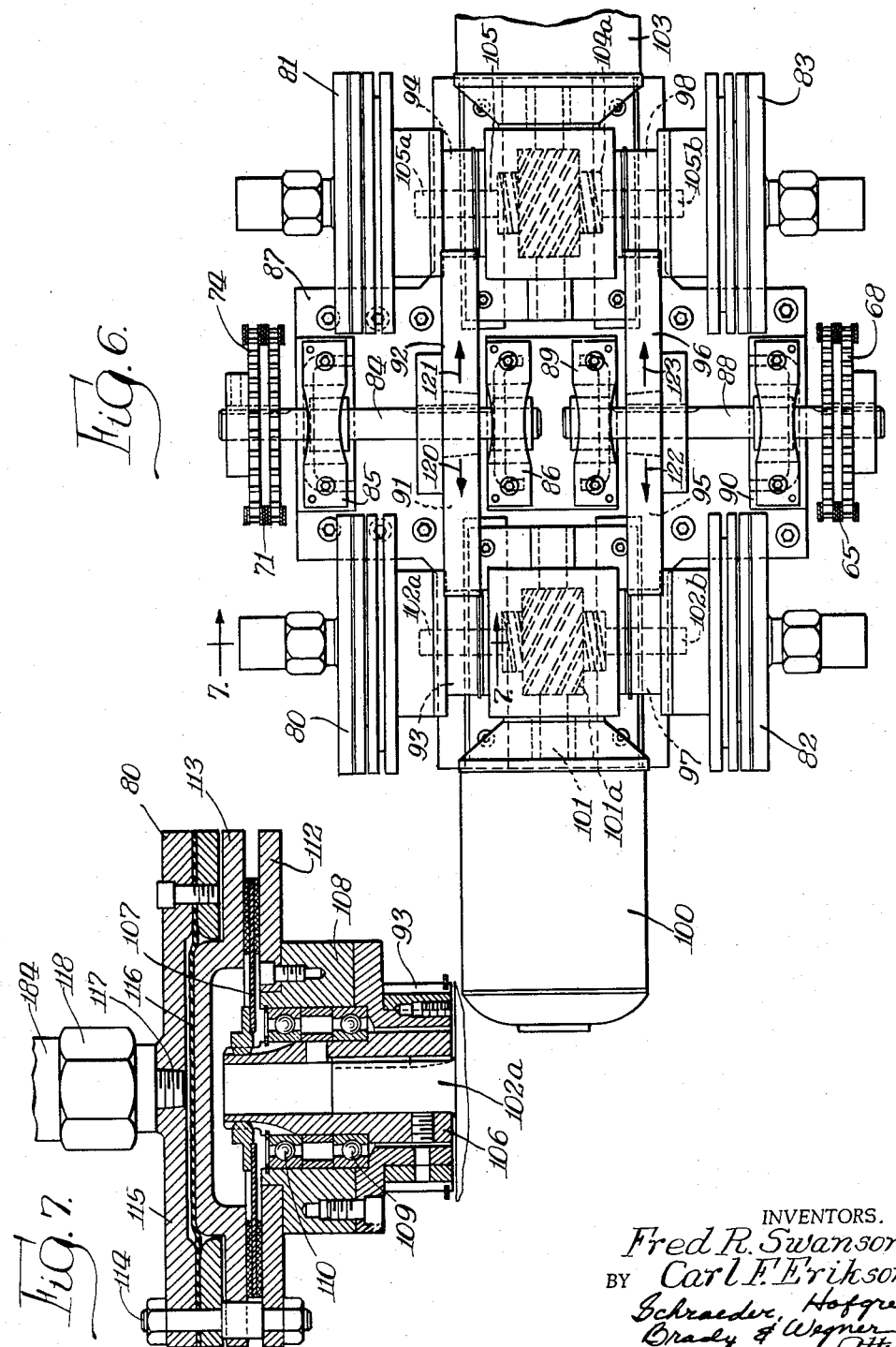

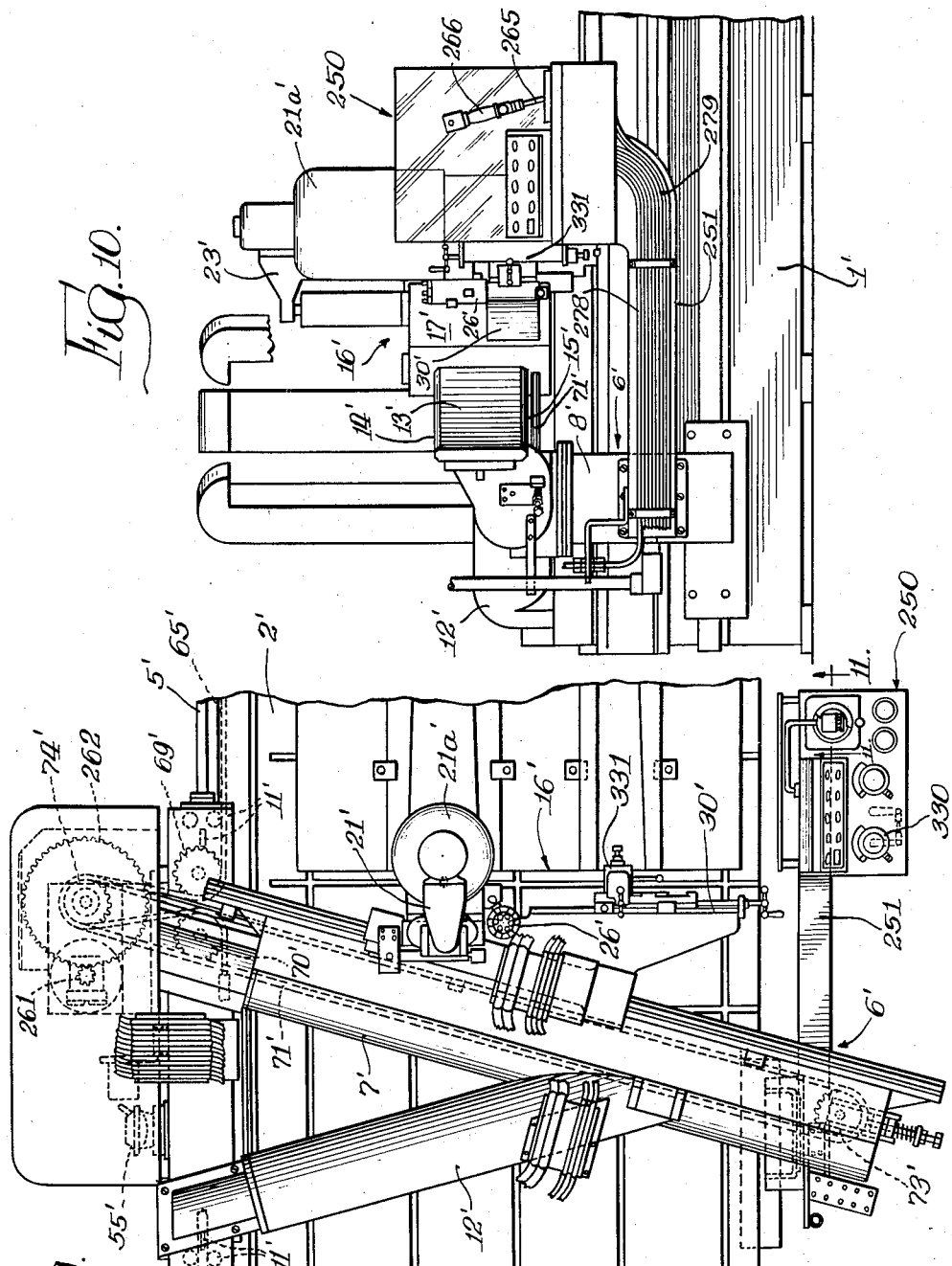

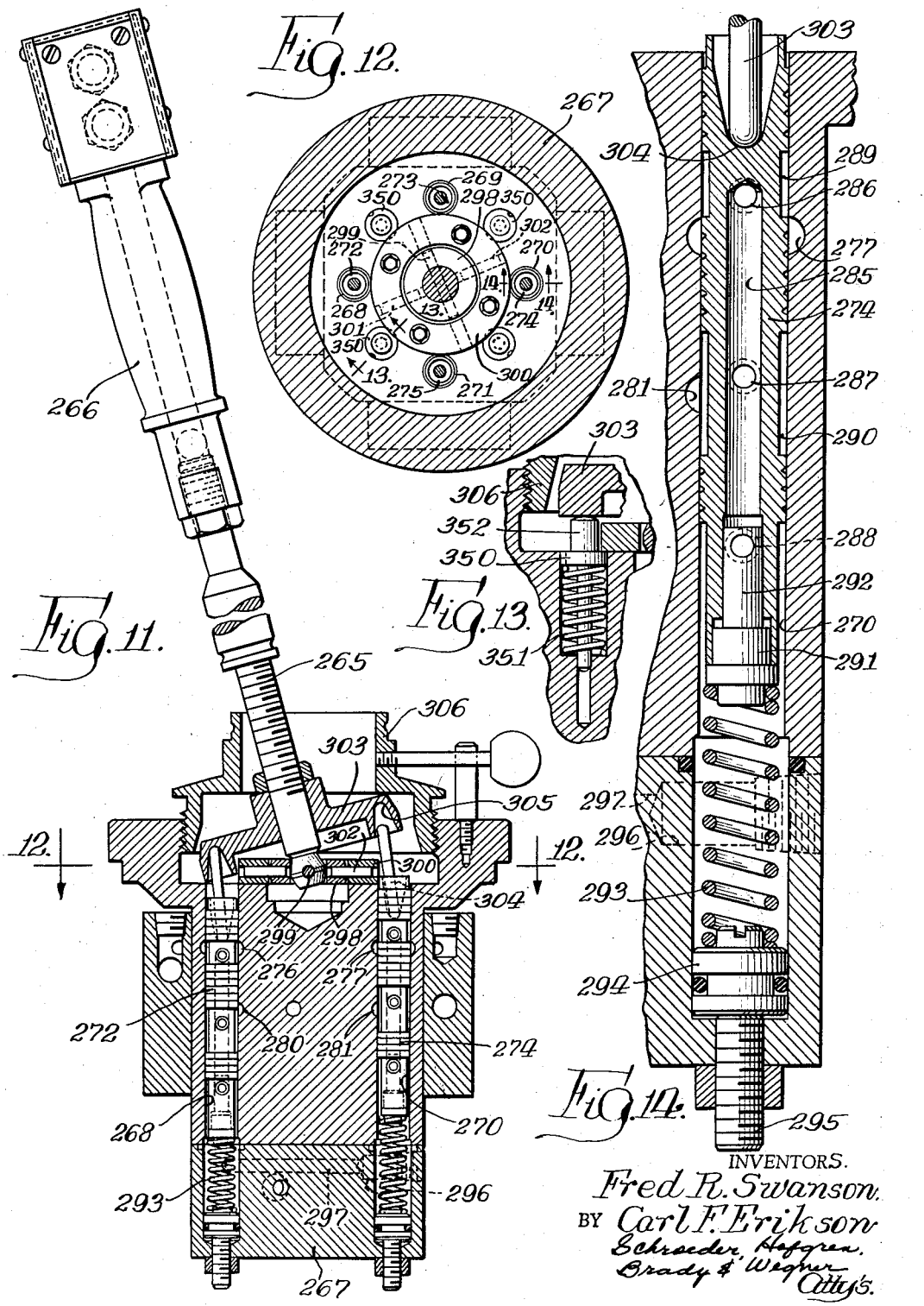

INVENTORS.
Fred R. Swanson.
BY Carl F. Erikson,
Schroeder, Hofgren,
Brady & Wegner
Attys.

United States Patent Office 2,918,850
Patented Dec. 29, 1959

2,918,850

MACHINE TOOL

Fred R. Swanson and Carl F. Erikson, Rockford, Ill., assignors to Sundstrand Corporation, a corporation of Illinois Application March 10, 1958, Serial No. 720,492

15 Claims. (Cl. 90—13.5)

This invention relates to a machine tool, and more particularly to a router having selectively operable power mechanism for driving router components with a variable force.

An object of this invention is to provide a new and improved machine tool having a mechanism for moving a tool with infinitely variable amounts of force.

A further object of this invention is to provide a router having a selectively operable power mechanism to move the router components with varying amounts of force in a desired direction while at all times subject to a maximum feed rate.

Another object of the invention is to provide a router having a bed provided with a work supporting table, a gantry movable along the table, a saddle movably mounted on the gantry above the table for movement transversely thereof, a tool head carried on the saddle and adapted to carry a downwardly extending tool, and control mechanism carried on the gantry including a handle operable to control exertion of force on the gantry and saddle in direction and amounts determinable by an operator's positioning of the handle to urge the tool head in a desired direction.

Another object of the invention is to provide a router, as defined in the preceding paragraph, wherein the control mechanism includes a control rod to which said handle is connected, a housing mounted on the gantry, means mounting the rod in the housing for universal movement including spring mechanism for holding the rod in a neutral position, a plurality of valve members slidably mounted in the housing, there being a pair of valve members for each of the gantry and saddle with one for each direction of movement of the gantry and saddle wherein movement of any of the valve members by tilting of the control rod renders the force exerting means operable, the valve members moved and the amount of their movement determining the direction and amount of force applied to the gantry and saddle.

A further object of the invention is to provide a machine tool having a first support, a second support slidable on the first support and adapted to carry a tool, a variable force transmission and control therefor including a first drive shaft operatively connected to said first support, a second drive shaft operatively connected to said second support, a pressure-responsive reversible drive means associated with each drive shaft for driving the shaft in opposite directions of rotation, and means for controlling the drive means for a drive shaft including a pair of valves each having a valve member, means connecting the valve members of a pair of valves to the associated drive means whereby the degree of driving force and direction thereof is proportional to the position of the valve member and the valve member shifted, respectively, and a control member for shifting one or two of the valve members to apply force to one or both of said drive shafts in a direction and amount dependent on the position of the control member.

The objects of the invention generally set forth, together with other ancillary advantages, are attained by the construction and arrangement shown by way of illustration in the accompanying drawing, in which:

Fig. 1 is a front view in elevation of the machine tool with part of the bed and work supporting table removed and parts of hose connections broken away;

Fig. 2 is an end view in elevation of the machine tool taken from the right side thereof, as viewed in Fig. 1, with parts of hose connections broken away;

Fig. 3 is a plan view of the machine tool with parts of the bed and work supporting table removed and parts of hose connections broken away;

Fig. 4 is a diagrammatic view of the hydraulic circuit for the machine tool including the mechanism associated with the hydraulic components and showing the control valve in section on an enlarged scale and taken generally along the line 4—4 in Fig. 5 with the control rod in a neutral position.

Fig. 5 is a vertical section on an enlarged scale through the control mechanism carried on the saddle and showing the relationship between the manually operable handle and the control rod and associated mechanism;

Fig. 6 is an elevation view on an enlarged scale of the power mechanism for providing a power assist to the gantry and saddle and is taken from the rear of the machine and looking toward the left with respect to the machine tool as shown in Fig. 2.

Fig. 7 is a vertical section taken through one of the drive clutches generally along the line 7—7 in Fig. 6;

Fig. 8 is a top plan view of the mechanism shown in Fig. 6;

Fig. 9 is a fragmentary plan view of a preferred embodiment of the machine tool with parts of the bed and work supporting table removed and parts of hose connections broken away;

Fig. 10 is a fragmentary front view in elevation of the preferred embodiment of the machine tool with part of the bed and work supporting table removed and certain hose connections omitted;

Fig. 11 is a vertical section on an enlarged scale through the control mechanism carried on the gantry in the preferred embodiment and taken along the line 11—11 in Fig. 9;

Fig. 12 is a horizontal section of the control mechanism taken generally along the line 12—12 in Fig. 11;

Fig. 13 is a fragmentary vertical section taken generally along the line 13—13 in Fig. 12;

Fig. 14 is a fragmentary vertical section on a further enlarged scale of one of the control valves of the control mechanism and taken generally along the line 14—14 in Fig. 12.

Figure 15:
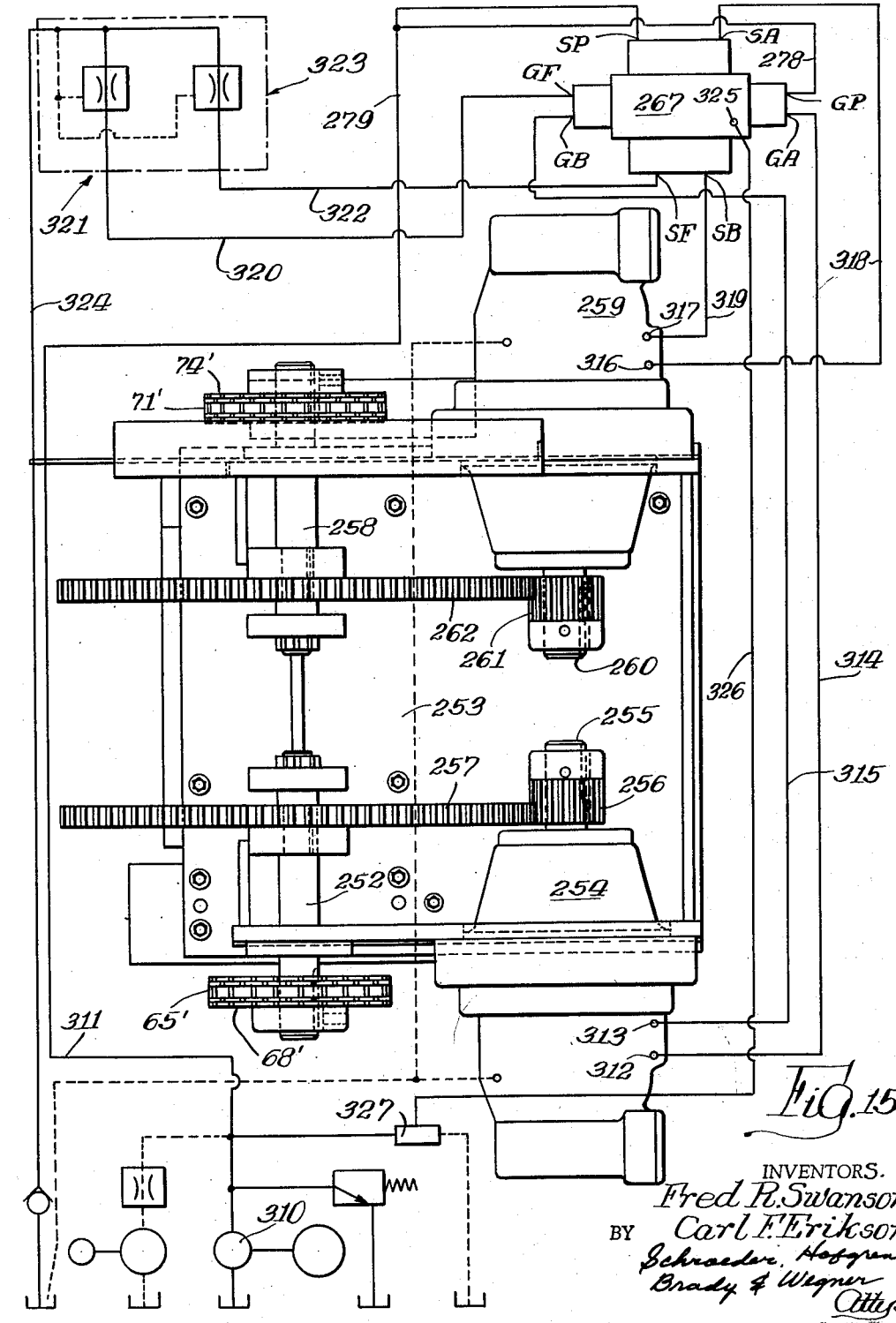
Fig. 15 is an elevational view of the drive mechanism for the gantry and saddle and including a diagrammatic view of the hydraulic circuit for the drive means.

While this invention is susceptible of embodiments in many different forms, there is shown in the drawings and will herein be described in detail a preferred embodiment of the invention and a modification thereof with the understanding that the present disclosure is to be considered as an exemplification of the principles of the invention and is not intended to limit the invention to the embodiment illustrated. The scope of the invention will be pointed out in the appended claims.

The machine tool, in the embodiment of Figs. 1–8 and as shown generally in Figs. 1, 2 and 3, comprises an elongated bed 1 which supports a generally coextensive work supporting table 2 on its top. The table 2 has a series of spaced apart slots 3 for use in attaching parts later to be described. The bed 1 has a front way 4 and a rear way 5 extending along its length for supporting a gantry indicated generally at 6.

The gantry 6 has a cross part 7 extending generally transversely of the table 2 but at an angle, as shown in Fig. 3, and at one end has a leg 8 extending downwardly alongside the front way 4. The gantry cross part 7 at its rear is connected to a leg 9. The leg is elongated in a direction parallel to the table 2 and generally surrounds the rear way 5 on the bed 1. In order to reduce friction to a minimum and to enable manual movement of the gantry 6 along the table 2, the gantry legs 8 and 9 are provided with rollers 10 and 11, respectively, which rollingly support the gantry on the gantry ways 4 and 5. A brace member 12 connects between the rear gantry leg 9 and the gantry cross part 7 to aid in rigidifying the gantry structure.

The gantry cross part 7 is formed with a flat face 13 having upper and lower saddle ways 14 and 15, respectively, formed along its upper and lower edges. These ways extend above, and entirely across, the width of the table 2 to enable a saddle indicated generally at 16 to be located in any position along the length thereof transversely of the table. A saddle base 17, as shown in Fig. 1, lies in front of the flat face 13 of the gantry cross part 7 and may have rollers (not shown) with suitably beveled faces engaging the upper and lower saddle ways 14 and 15 to rollingly support the saddle 16 on the gantry 6 to enable manual movement of the saddle relative thereto. The saddle base 17 is provided with vertically extending ways 20 for slidably supporting a tool head 21 for movement toward and away from the worktable 2. A motor 21a is mounted on the tool head 21 and a tool, such as a milling cutter 22, is shown extending downwardly from the tool head 21. The tool head has an arm 23 at its top which overlies a pair of vertically extending cylinders. A first cylinder 24 is an air cylinder having air under pressure directed to the underside of a piston therein so as to aid in counterbalancing the weight of the tool head. A second cylinder 25 is a hydraulic cylinder for controlling the up-and-down movement of the tool head. An indexable turret 26, carrying an angularly spaced series of stops 27 at different settable heights, is positioned so as to have one of the stops 27 coact with a stop 28 on the tool head so as to determine the lower position of the tool head.

The saddle base 17 has ways indicated generally at 30 which extend generally horizontally and transversely of the table for adjustably mounting a control head 31. The control head may be adjusted on the ways 30 by a suitable screw shaft, the end of which is shown at 32. The control head 31 has a pair of vertical bores 33 and 34 in either of which a carrier 35 for a template follower 36 may be placed. The carrier 35 may be adjusted vertically within either of the bores by rotation of a hand wheel 37 having a gear (not shown) associated with each of the bores and engageable with a rack (not shown) formed along the length of the carrier. The adjustability of the carrier 35 and the tool head 21 enable the height relationship between the parts to be varied dependent upon the height of template and surface on a workpiece to be cut.

A control arm 38 extends outwardly away from the control head 31. The arm 38 carries control means including a housing 39 and manually operable handles 40 and 41 and other mechanism, as more fully described hereinafter.

The foregoing structure discloses generally a router or duplicating machine embodying an elongated worktable along which a gantry may travel with a saddle movably mounted on a cross part of the gantry above the table for movement transversely of the table. An operator, grasping the handles 40 and 41 carried on the control arm 38, may direct the tool head 21 in any direction to any area of the worktable 2 as a resultant of movements of the gantry along the table length and the saddle transversely of the table length. In order to guide the cutter 22, a routing collar (not shown) may be placed around the cutter 22 for use with an overlay template, or, as shown in Figs. 1-3, a template follower 36 may be used. A template follower 36 may follow a suitable template 50 carried on a plate 51 suitably attached to the slots 3 in the worktable 2. A pattern may be produced in a workpiece 52 corresponding to the pattern of the template 50 by causing the template follower to engage against the contour of the template which produces corresponding movements of the cutter 22. It is believed obvious that the template 50, plate 51, and workpiece 52 may take any desired shape so long as the parts are within the operative area of the template follower 36 and cutter 22 as determined by the longitudinal travel of the gantry 6 and the transverse travel of the saddle 16. The angle of the gantry cross part 7 facilitates visual observation of the cutting operation by an operator as he is holding the handles 40 and 41.

If it is desired to use only one component of movement for the tool head 21, namely, either movement of the gantry or saddle, it is possible to hold either the gantry or saddle against movement. The gantry may be held against movement by means of a clamp indicated generally at 55 which is carried on the rear gantry leg 9 and has an air operated motor 56 for moving clamping members (not shown) into engagement with the rear way 5 on the bed 1 under the control of a button 56a carried on the handle 41. The saddle may be held against movement along the saddle ways 14 and 15 by means of a clamp indicated generally at 57 (Fig. 3) which includes an air motor 58 engageable with a lever 59 pivoted at 60 for pressing a pin (not shown) against the upper way 14 when the air motor is energized under the control of a button 61 on the handle 41.

A drive mechanism for the gantry 6 comprises an elongated member 65, such as a chain, secured at its ends to the rear side of the bed 1 as indicated at 66 and 67, as shown in Fig. 3. The chain 65 intermediate its ends extends around a drive sprocket 68 (Fig. 6) and a pair of idlers 69 and 70, all of which are carried on the gantry.

A drive mechanism for the saddle along the saddle ways includes an endless member 71, such as an endless chain, which is fastened to the saddle base 17 as indicated at 72. The chain 71 extends around a tensioning idler 73 carried at the front end of the gantry cross part 7 and also passes around a drive sprocket 74 (Fig. 6).

The drive sprockets 68 and 74 may be urged to rotate in either direction by a pair of clutches associated with each of the drive sprockets. As shown in Fig. 6, the clutches 80 and 81 are associated with the drive sprocket 74, and a pair of clutches 82 and 83 are associated with the drive sprocket 68. The drive sprocket 74 for the saddle is keyed to a shaft 84 rotatably mounted in bearing blocks 85 and 86 secured to a plate 87 which is fastened to the gantry leg 9. The drive sprocket 68 for the gantry is keyed to a shaft 88 rotatably mounted in bearing blocks 89 and 90 fastened to the plate 87. The sprocket shaft 84 has a toothed pulley 91 of relatively large diameter which is engaged by a toothed belt 92 passing around toothed pulleys 93 and 94 associated with the clutches 80 and 81, respectively. The sprocket shaft 88 has a similar large diameter, toothed pulley 95 around which a toothed belt 96 passes and also around toothed output pulleys 97 and 98 associated with the clutches 82 and 83.

A first drive motor 100 drives a worm shaft 101 engageable with a worm wheel 101a on a drive shaft 102 which extends above and below the worm 101. A second drive motor 103 rotates a worm 104 in a direction opposite to the worm 101 for rotating a worm wheel 104a and a drive shaft 105 extending above and below the worm. The drive shaft 102 has ends 102a and 102b which connect with the input shaft of the clutches 80 and 82, respectively, and the drive shaft 105 has ends 105a and 105b which connect with the input shafts of clutches 81 and 83, respectively. The clutches are identical, and, therefore, a description of the clutch 80, as shown in Fig. 7, is believed sufficient. The end 102a of the drive shaft 102 is keyed to an input shaft 106 which has a clutch plate 107 constituting a driving element keyed thereto. An output shaft 108, to which the toothed pulley 93 is fastened, surrounds the input shaft 106 and is rotatably mounted relative thereto by bearings 109 and 110. The output shaft 108 carries driven elements, one of which is a plate 112, and the other a plate 113 which is mounted for slight, vertical movement so as to be responsive to fluid pressure. The plate 113 is mounted for rotation with the plate 112 by means of a plurality of pins, one of which is shown at 114, which pins also fasten a cover 115 and a diaphragm 116. The cover 115 is provided with a fluid inlet 117, and a coupling 118 connects the rotating clutch with a stationary fluid line 184.

It will be seen from the foregoing that a pair of clutches are associated with each of the drive sprockets 68 and 74, respectively. In each pair of clutches there is, in effect, a forward clutch and a reverse clutch for applying force to the sprocket shaft in opposite directions. More specifically, the clutch 80 can function, when operative, to move the toothed belt 92 in the direction of arrow 120, while the clutch 81, when operative, would function to move the toothed belt 92 in the direction of arrow 121. Similarly, the clutch 82 would move the belt 96 in the direction of arrow 122, and clutch 83 would move the belt 96 in the direction of arrow 123.

Control means for rendering operable one or two of the clutches 80, 81, 82 and 83 are carried on the control arm 38, previously referred to, and include a control rod 125 which is mounted for universal movement in a cavity 126 provided in the housing 39. The control rod 125 carries a disc 127 at its lower end which has an annular flange 128 which releasably interfits with an annular groove 129 formed in the housing 39. The control rod has a neutral position in which the annular flange 128 would seat along its entire length in the groove 129, the control rod being shown tilted in Fig. 5 away from its neutral position.

The control rod 125 has a spherical enlargement 130 arranged to be engageable with four, angularly spaced valve members 131, 132, 133 and 134 (Fig. 4) which lie in a plane intersecting the axis of the control rod and radially thereof.

The amount of force required to tilt the control rod 125 may be varied by means of adjusting mechanism including a spring 135. The spring 135 is mounted between the disc 127 and a disc 136 threadably mounted on a rotatable pin 137. A pin 138 mounted in the housing 39 interfits with the disc 136 so as to prevent rotation thereof, and thus the disc 136 may be moved up or down by rotation of the pin 137 so as to vary the compression of the spring 135. Thus, the amount of push exerted by an operator before the power assist mechanism comes into operation may be readily varied. The maximum tilt of the control rod 125 may be varied by means of a conical collar 140 which may be placed at different positions axially of the control rod 125 and held in an adjusted position by a fastening member 141. The conical collar 140 has a conical surface 142 which engages a circular edge 143 at the top of the housing cavity 126 to limit the tilt of the control rod 125. The amount of tilting of the control rod determines the maximum power assist provided to the gantry and saddle.

A flexible jacket 144 may enclose the upper end of the housing cavity 126. A handle bar 145 carries the handles 40 and 41 at its ends and intermediate its ends is connected to the conical collar 140 by a plurality of bolts 146.

The valve members 131, 132, 133 and 134 are slidably mounted in bores 151, 152, 153 and 154 formed in the housing 39 so as to constitute a control valve. The valve members are identical and each has a stem 155 provided with an end 156 which is engaged by the spherical enlargement 130 on the control rod 125. Each valve stem 155 carries a valve spool 157 and has spaced lands 158 and 159 with a groove 160 therebetween. A recess 161 in land 158 has a gradually increasing depth as it approaches the groove portion 160 of the valve member. This recess extends for only a portion of the length of valve land 158, as shown in Fig. 5.

The control valve, including valve members 131, 132, 133 and 134, is shown in section in Fig. 4 in which the valve members 131 and 133 lie on an axis extending normal to the length of the work supporting table 2, and the valve member 131, when operated, causes the saddle 16 to move toward the rear of the worktable 2 in response to a tilting of the control rod 125 in the same direction. The valve member 133 causes the saddle 16 to move toward the front of the worktable 2 in response to a tilting of the control rod 125 in the same direction. The valve members 132 and 134 lie on an axis extending in the same general direction as the length of the work supporting table 2 but at a slight angle thereto. The valve member 132 causes the gantry 6 to move toward the left, as viewed in Fig. 1, in response to tilting of the control rod 125 in the same direction. The valve member 134 causes the application of force to the gantry 6 tending to move the gantry toward the right, as viewed in Fig. 1, in response to tilting of the control rod 125 in the same direction.

As shown in Fig. 4, the alignment of the valves 131, 132, 133 and 134 is such that tilting of the control rod 125 in a plane extending parallel to the length of the work supporting table 2 will result in application of force to the gantry 6 alone, while movement of the control rod in a plane normal to the length of the worktable 2 will result in applying force to the saddle 16 and the application of a lesser force to the gantry 6 by imparting some movement to either of the valve members 132 or 134.

Referring to Figs. 4 and 5, a source of oil under pressure indicated generally at 165 has an outlet line 166 connected to a flexible hose connection 167 which, by lines 168, 169, a flexible connection 170, and line 171, is connected to a pressure inlet port 172 in the control valve housing 39. The flexible hose connections 167 and 170 appear in Figs. 2 and 3 and enable the formation of downwardly extending loops so as to permit the movement of the gantry 6 relative to a station 173 at which the oil source 165 is located. The flexible connection 170 permits movement of the saddle 16 with respect to a hose support 174 carried on the gantry.

The pressure inlet port 172 communicates with a passage 175 formed in, and generally encircling, the housing 39. The passage 175 communicates with the outer ends of the valve bores 151, 152, 153 and 154 so that oil under pressure is directed inwardly against the outer spool 158 of the valve members 131–134. A discharge passage extends upwardly from each of the valve bores, as indicated at 176, 177, 178 and 179, and they are plugged at their upper ends. The discharge passages have discharge outlets 180, 181, 182 and 183, respectively, each of which, by a line 184, 185 and 186 and 187 including flexible hose connections 188, 189, 190 and 191, is connected to the fluid inlets 117 of the clutches 80, 82, 81 and 83, respectively. The flexible hose connections 188–191, inclusive, permit relative movement between the control valve housing 39 carried on the saddle 16 and the power station at which the clutches are located on the gantry 6.

In operation, the gantry 6 and saddle 16 may be manually moved by grasping of the handles 40 and 41. If this is done without tilting of the control rod 125, the movement will be entirely by manual force. Whenever a power assist for one or both of the gantry and saddle is desired, a sufficient force may be applied to the control rod 125 to tilt the rod against the action of the spring 135 in a direction of desired movement for the cutting tool 22. This tilting of the rod will result in shifting either one or two of the valve members 131–134, inclusive, and the shifted valve members will be moved radially outward to cause the groove 161 formed in the valve spool 158 to connect the pressure fluid passage 175 with a discharge passage associated with the shifted valve member. This will create an oil flow through the bore of the shifted valve member, and the rate thereof will depend upon the extent to which the valve member has been shifted because of the varying depth of the recess 161 in the valve land 158. The induced oil flow will result in exerting a pressure on the upper side of the diaphragm 116 in the associated clutch, and this pressure will increase as the oil flow increases. This pressure is created by a plurality of needle valves 195, 196, 197 and 198 in the lines 184–187, inclusive. All of the lines 184–187, inclusive, are connected to a tank 199 by a line 200 including a flexible hose connection 201. It will be seen that the position of the conical collar 140 (Fig. 5) will thus determine the maximum pressure on a diaphragm 116 and thus limit the force output of a clutch.

The shifting of one or two of the valve members 131–134, inclusive, will result in drivingly engaging one or two of the clutches 80–83, inclusive, depending upon which valve members are shifted. This results in the application of force to one or both of the gantry drive sprocket 68 and the saddle drive sprocket 74 to move either the gantry or saddle, or at least exert force on these parts, to urge the cutting tool 22 in the desired direction. This provides a variable force which is applied to the gantry and saddle, and the feed rate of the cutting tool 22 in a cutting operation will depend on the resistance to cut. The power assist mechanism having a variable force output does not attempt to maintain a constant feed rate. In a conventional machine tool feed box, when the resistance to the cut increases, the feed box increases its force output as required up to a relatively high maximum force. This can result in severe deflections of some machine members. With the subject assist mechanism, the output force cannot increase thereby controlling machine deflections to small predetermined amounts.

The control valve housing 39 has its cavity 126 filled with oil up to the level of a drain outlet 205 which connects with the cavity by a lateral passage 206 and a vertical passage 207. The drain outlet 205 is connected to the tank 199 by a line 208, including flexible hose connections 209 and 210, and through a venturi valve 211.

Further as shown in Fig. 4, the tool head 21 is controlled in its raising and lowering movements so as to position the cutter 22 relative to a workpiece by the hydraulic cylinder 25 which has its lower end connected to the pressure line 168 by four-way valves 215 and 216 which are normally urged to a position to connect the line 168 and inlet 217 at the lower end of the cylinder 25 when a cutting operation is not in process. This, with the counterbalance cylinder 24, maintains the head 21 in its upper position. This connection is completed by lines 218, 219 and 220, flexible hose connections 221, 222 and 223, and a flow regulating valve 224. When it is desired to lower the cutting tool 22 for a cutting operation against the action of the counterbalancing cylinder 24 and down to a position against one of the stops 27 on the indexable turret 26, a pair of buttons 225 and 226 carried on the handle 40 and operable by a thumb plate 227 may be depressed which energizes a solenoid 228 associated with the valve 215 so as to shift the valve 215 against a spring 229 to direct pressure through a line 230 to a port 231 at the upper side of the cylinder 25. Continued depression of the buttons 225 and 226 will maintain the stop 28 on the tool head 21 against one of the stops 27 on the indexable turret 26 during a cutting operation. If, during the descent of the tool head and with both buttons 225 and 226 depressed, it is desired to stop the tool head and maintain it in its stopped position, the thumb plate 227 may be released sufficiently so as to release one of the buttons associated therewith, which is shorter than the other, which results in additionally energizing a solenoid 232 associated with the valve 216 to shift the valve against a spring 233 so as to block the lower port 217 of the cylinder 25 with oil under pressure still connected to the cylinder inlet 231. When the tool head 21 is to be raised, the thumb plate 227 may be released which permits the air cylinder 224 to raise the head with an assist from the hydraulic system.

The preferred embodiment of the invention is shown in Figs. 9–15 in which parts corresponding to those shown in the embodiment of Figs. 1–8 have been given the same reference numeral with a prime affixed thereto. In the preferred embodiment, the manual movement of the saddle and gantry is not contemplated and therefore the following mechanism provides power for movement rather than a power assist.

In the preferred embodiment a control station, indicated generally at 250, is mounted on an arm 251 extending horizontally from the gantry leg 8'. The mounting of the control station 250 on the gantry causes the control station to move with the gantry 6' but not to move with the saddle 16' in its movement relative to the gantry.

The drive mechanism for the gantry 6' and the saddle 16' is the same as in the previously described embodiment to the extent that chains 65' and 71' are mounted in the manner previously set forth and are associated with a pair of drive sprockets 68' and 74', respectively. The gantry drive sprocket 68' is affixed to a rotatable shaft 252. The drive shaft 252 is supported on a plate 253 which is carried on the gantry 6'. The shaft 252 is driven by a reversible pressure responsive fluid motor 254 having an output shaft 255 which is coupled to the shaft 252 by gears 256 and 257.

The saddle drive sprocket 74' is affixed to a shaft 258 rotatably mounted on the plate 253. A second reversible pressure responsive fluid motor 259 has an output shaft 260 which is coupled to the drive shaft 258 by a pair of gears 261 and 262.

A control mechanism includes parts at the control station 250 and more particularly a control rod 265 having a handle 266 which is mounted in a housing 267 (Fig. 11) for universal movement. The housing 267 contains four valve chambers 268, 269, 270 and 271 which are equally spaced apart in a circular disposition about the control rod 265 (Fig. 12). Each of the valve chambers slidably mounts for up and down movement one of a plurality of valve members 272, 273, 274 and 275, respectively. The valve members 272 and 274 are in opposed relation at opposite sides of the control rod 265 and form a pair of valve members for controlling the movement of the gantry relative to the table 2'. The valve members 273 and 275 are in opposed relation and form a pair of valves for controlling the movement of the saddle 16' along the gantry 6' in a direction generally transverse to the table 2'. Each of the valve chambers 268–271 has an annular groove as indicated at 276 and 277 for the valve chambers 268 and 270 for directing fluid under pressure to the valve chambers. The pressure grooves of each pair of valve members are connected together and are connected to a pressure inlet GP in the housing (Fig. 15) which connects to a line 278. The corresponding pressure grooves for the valve members 273 and 275 are connected together to an inlet SP in the housing which is connected to a pressure line 279.

Each of the valve chambers has a motor groove positioned beneath the pressure groove and the motor grooves for the chambers 268 and 270 are shown at 280 and 281, respectively. The motor grooves are each independent of the other. Referring to Fig. 15, the motor groove 280 communicates with a port GB and the motor groove 281 communicates with a port GA. The motor ports for the valve chambers 269 and 271 communicate with the ports SA and SB, respectively.

Each of the valve members 272–275 are of the same construction and, as shown in Figs. 11 and 14, are in the form of an elongated generally cylindrical member having an internal bore 285 open to one end of the valve member and having three spaced apart radial passages 286, 287 and 288 which connect the bore 285 with the valve chamber 270. The reduced annular grooves 289 and 290 are provided on the valve chamber in the area of the radial passages 286 and 287 whereby the bore 285 is selectively placed in fluid communication with the pressure groove 277 and the bore 285 is, at all times, in communication with the motor groove 281.

The open end of the bore 285 movably mounts relief valve member 291 which, as shown in Fig. 14, has an innermost position wherein a relief valve stem 292 blocks the radial passage 288 from communication with the bore 285. A spring 293 abuts between the relief valve member 291 and a disc 294 movably mounted in the bottom of the valve chamber 270 and functions to yieldably maintain the relief valve member 291 in its innermost position. The force exerted by the spring 293 may be increased by movement of the adjusting screw 295 inwardly of the chamber 270 to raise the disc 294 therein and additionally compress the spring 293. Each of the valve chambers 268–271 have an opening adjacent their lower end with the opening for valve chamber 270 shown at 296 and the openings for an opposed pair of valves are interconnected as by channel 297 for the openings in valve chambers 268 and 270. The channel 297 communicates with a port GF shown in Fig. 15. The corresponding openings for the valve chambers 269 and 271 communicate with a port SF shown in Fig. 15.

The control rod 265 at its lower end is pivotally mounted in a ring 298 by a pin 299 and the ring 298 is pivotally mounted about a second axis and on a ring 300 surrounding the ring 298 by pins 301 and 302 whereby the control rod 265 may tilt in any direction. A disc 303 is fastened adjacent the lower end of the control rod 265 and functions to control the position of the valve members 272–275. For this purpose a pin 304 extends loosely between a dished-out upper end 304 of each of the valve members 272–275 and at its other end is associated with a dished-out section 305 on the underside of the disc 303. There are a total of four pins 304 associated one with each of the valve members. The maximum tilt of the control rod 265 is determined by the position of a cap 306 threadably mounted on the housing 267 and adjustable relative thereto and engageable with the disc 303 to limit the pivoting of the control rod.

Referring to Fig. 15, a motor driven pump 310 is connected by a line 311 to the pressure lines 278 and 279 whereby to supply fluid under pressure to the ports GP and SP, respectively. The gantry control ports GA and GB are connected to ports 312 and 313 of the gantry drive motor 254 by lines 314 and 315, respectively. The saddle control ports SA and SB are connected to ports 316 and 317 of the saddle drive motor 259 by lines 318 and 319, respectively. The gantry relief port GF is connected by a line 320 to a flow control indicated generally at 321 and the saddle relief port SF is connected by a line 322 to a flow control indicated generally at 323. The outlets of the flow controls 321 and 323 are connected to drain by a line 324. A scavenge port 325 in the control housing 267 is connected by a line 326 through a venturi 327 to tank.

The flow controls 321 and 323 are provided to determine the maximum feed rate of the tool head 21' and for this purpose are mechanically connected together (not shown) for adjustment by a control member 330 provided at the control station 250 (Fig. 9).

The ways 30' formed on the saddle 16' adjustably mount a template follower 331 which includes mechanism for up and down adjustment.

In operation the control rod 265 will extend vertically upward when the parts are in neutral. In this position the valve members 272–275 will be in a position slightly beneath the position of valve member 274, as shown in Fig. 11. In the position of Fig. 11, the pressure grooves are blocked from communication with the internal bore 285 of the valve members. In the neutral position the pressure grooves 276, 277 connect with the bore 285 and the radial passages 287 connect the motor grooves of the valve chambers. Thus, in neutral there is balanced pressure input to both sides of the drive motors 254 and 259 and the saddle and gantry do not move. When the control rod 265 is tilted to the position shown in Fig. 11, the valve member 275 is lowered against the spring 293 to increase the flow path between the bore 285 and the pressure groove 276 through the radial passage 286. The opposite valve member 274 will shift upwardly from neutral position to close off its bore 285 from the pressure groove 277. As a result fluid under pressure is directed to the drive motor 254 through port GB and line 315 and flowing from the motor port 312 will pass through line 314, port GA, valve chamber 270, radial passage 287 and the valve member bore 285 of valve member 274. The valve member 274 has its relief valve member 291 maintained in a closed position with a minimum force by the spring 293 whereby fluid flowing from the motor 254 into the bore 285 will depress the relief valve stem 292 to open the radial passage 288 so that fluid may flow through the relief passage 297 out of the port GF. From the port GF the fluid flows through line 320 to the flow control 321 and then to the tank through line 324.

In this preceding operation variable amounts of force are applied to the gantry 6' as determined by the degree of tilt of the control rod 265. The fluid pressure upon the drive motor 254 is subject to the control of relief valve member 291 of the valve member 272. This relief valve member will open when the spring force acting thereagainst is exceeded, and this spring force increases as the amount of tilt of control rod 265 increases. With a degree of tilt less than that shown in Fig. 11 the force of spring 293 would be less so that an excessive pressure of the fluid would open the relief valve. The position of the control rod as shown in Fig. 11 exerts a greater force on the spring 293 so that the fluid pressure exerted on the motor 254 may be greater.

The movement of the gantry may be in the opposite direction if caused by opposite tilting of the control rod from the position shown in Fig. 11. In this opposite position the valve member 274 would be depressed while the valve member 272 would be above the neutral position. Fluid under pressure from port GA would be directed to motor port 312 while outlet fluid from the motor would pass through line 315 to port GB through the valve member 272 and then out of port GF to the flow control 321.

The tilt of the control rod 265 may be in a plane including the valve members 273 and 275 resulting in shifting one of the valve members from neutral to cause operation of the motor 259 in a manner similar to that described for motor 254 to move the saddle relative to the gantry. The operation with respect to the direction of movement, the maximum driving force and the maximum feed rate would be similar to that disclosed with reference to operation of the valve members 272 and 274.

The motors 254 and 259 for the gantry and saddle, respectively, are of a type wherein the force output thereof is proportional to the pressure applied thereto so that a tilting of the control rod 265 need only be sufficient to cause the tool head 21' to move at the desired rate. If increased resistance to cutting is encountered, the control rod 265 may be tilted an additional amount to increase the pressure exerted on the motors to increase the force output thereof. When the tool runs out of the cut so as to remove any resistance to movement of the gantry and saddle, the maximum feed rate control provided by the flow controls 321 and 323 will prevent running away of the gantry and saddle. It is believed obvious that the movement of the tool head 21' resulting from movement of the gantry and saddle may be in any direction dependent upon the direction of tilt of the control rod 265 and that a single valve member may be shifted or two valve members one from each pair of opposed valve members.

The disclosed control is effective when the driving means is operating in its normal direction or when the tool is being caused to move in the reverse direction by a template so that the template follower will closely follow the template.

A suitable shoulder (not shown) on ring 300 may be associated with each of the valve members 272–275 to maintain an upper limit position of each valve member above the neutral position.

As shown in Figs. 12 and 13 a plurality of bores 350 are formed in the housing 267 each of which has a spring 351 positioned therein for urging a plunger 352 into engagement with the disc 303 on the control rod and which function to yieldably maintain the control rod in a neutral position.

This application is a continuation-in-part of our application Serial No. 657,533, filed May 7, 1957.

We claim:

1. A machine tool having a tool support, a work support, variable force means for moving one of the supports relative to the other in any direction which is a resultant of two motions, and control means controlling both the direction and driving force of the moved support, said control means including a movable member enabling continuous modulation of the driving force beneath an upper limit in any direction of movement of the moved support.

2. A machine tool as defined in claim 1 including means for selecting an upper limit to the driving force.

3. A machine tool as defined in claim 2 including means for selecting a maximum feed rate for the moved support.

4. A machine tool having a tool support, a work support, a template follower on the tool support means for moving one of the supports relative to the other in any direction which is a resultant of two motions, control means controlling both the direction and driving force of the moved support, said control means including a movable member enabling continuous modulation of the driving force beneath an upper limit in any direction of movement of the moved support, means for selecting an upper limit to the driving force, means for selecting a maximum feed rate for the moved support, and means rendering said force control effective when said moving means is operating.

5. A machine tool having a first movable support movable back and forth along a bed, a second support carrying a tool head movable mounted on said first support for back and forth movement transversely of the bed, means for moving said supports including a pair of reversible fluid motors operatively connected one to each of said supports for exerting a force thereon in a direction and in an amount proportional to the fluid pressure applied to the motor, a housing, a control member in said housing, four control valves each having a valve member movably mounted within individual chambers in the housing and disposed around the control member in two sets of opposed pairs for engagement by the control member to control the position of the valve members, means mounting the control member for movement toward one or two adjacent control valves, a pressure port and a motor port in the housing for each valve member, each valve member having an internal bore with a pair of spaced radial passages, one of said passages connecting the bore to the associated motor port in all positions of the valve member, a relief valve movably mounted in one end of said bore, spring means fitted between an end of the chamber and the relief valve for urging the relief valve to closed position and the valve member to a neutral position wherein the passages do not communicate with the pressure ports, means connecting the motor ports of opposed control valves to opposite sides of one of the fluid motors whereby shifting of a valve member from neutral position against the spring means connects the bore with a pressure port to create a pressure differential across the associated motor and exert a force on the associated support with the maximum pressure and force increasing with increased movement of the valve member by causing compression of the relief valve spring means, and means for limiting the fluid flow through the motors to define the maximum feed rate of the tool head.

6. A machine tool having a first movable support, a second support carrying a tool head movably mounted on said first support, one support being movable along a machine tool bed and the other movable transversely of the bed, means for moving said supports including a pair of reversible fluid motors operatively connected one to each of said supports for exerting a moving force thereon, a housing, a control member in said housing, four control valves each having a valve member movably mounted within individual chambers in the housing and disposed around the control member in two sets of opposed pairs for engagement by the control member to control the position of the valve member, means mounting the control member for movement toward one or two adjacent control valves, a pressure port and a motor port in the housing for each valve member, a relief valve associated with each valve member and movable by the control member, spring means for urging the relief valve to closed position, circuit means including said relief valve connecting the motor ports of opposed control valves to opposite sides of one of the fluid motors whereby shifting of a valve member connects a pressure port to the motor to create a pressure differential across the associated motor and exert a force on the associated support with the maximum pressure and force increasing with increased movement of the valve member by causing compression of the relief valve spring means, and adjustable flow control means for limiting the fluid flow through the motors to define the maximum feed rate of the tool head.

7. A machine tool having a first reversibly movable support, a second support carrying a tool head reversibly movably mounted on said first support for movement transversely thereof, means for moving said supports including a pair of reversible fluid motors operatively connected one to each of said supports for exerting a moving force thereon, a universally movable control member, control valve mechanism with a plurality of valve members movably mounted within individual chambers and disposed around the control member in two sets of opposed pairs for engagement by the control member to control the position of the valve members, a pressure port and a motor port for each valve member, each valve member having an internal bore with a pair of spaced radial passages, one of said passages connecting the bore to the associated motor port in all positions of the valve member, a relief valve movably mounted at one end of said bore, spring means fitted between an end of the chamber and the relief valve for urging the relief valve to closed position, and means connecting the motor ports of opposed control valves to opposite sides of one of the fluid motors whereby shifting of a valve member connects the bore in said valve member with a pressure port to create a pressure differential across the associated motor and exert a force on the associated support with the maximum pressure and force increasing with increased movement of the valve member by causing compression of the relief valve spring means.

8. A router having a gantry, a saddle carrying a tool head movably mounted on said gantry, a variable force transmission and control for moving said gantry and saddle including a first output member operatively connected to the gantry, a second output member operatively connected to said saddle, a pair of reversible fluid motors associated one with each of said output members, a plurality of valves with a pair of said valves in circuit with each motor and each connected to a separate port in the motor whereby opening of one valve in a pair causes the motor to rotate in one direction and opening of the other valve in a pair causes rotation of the motor in the opposite direction, a housing for said valves movably holding the valve members thereof with each pair in opposed relation and generally in line with the path of travel of the associated gantry or saddle, a control member movably mounted in said housing and selectively engageable with a single valve member or one in each pair for shifting thereof to control the direction of fluid flow through one or both of the motors, respectively, and the amount of fluid pressure exerted on said motor or motors whereby either the gantry or saddle or both are urged to move with a force dependent upon the degree to which the valve members are shifted, and means for limiting the fluid flow through the motors to determine the maximum feed rate of the tool head.

9. A machine tool having a first movable support, a second support carrying a tool head movably mounted on said first support, a variable force transmission and control for moving said supports including a first output shaft operatively connected to the first support, a second output shaft operatively connected to said second support, a pair of reversible fluid motors associated one with each of said output shafts, a plurality of valves with a pair of said valves in circuit with each motor and each connected to a separate port in the motor whereby opening of one valve in a pair causes the motor to rotate in one direction and opening of the other valve in a pair causes rotation of the motor in the opposite direction, a housing for said valves movably holding the valve members thereof with each pair in opposed relation and generally in line with the path of travel of a support, and a control member movably mounted in said housing and selectively engageable with a single valve member or one in each pair for shifting thereof to control the direction of fluid flow through one or both of the motors, respectively, and the amount of fluid pressure exerted on said motor or motors whereby one or both supports are urged to move with a force dependent upon the degree to which the valve members are shifted.

10. A power router having, in combination, an elongated bed having a work supporting table on the top thereof and a pair of elongated ways on its opposite sides, a gantry having a cross part extending above and generally transverse to the table, a pair of legs extending downwardly from the cross part at the sides of the bed and slidable on said ways, and saddle ways extending along the cross part, a saddle slidably mounted on the saddle ways for movement transversely of the table and having, a tool head on the saddle, means on the saddle for supporting a template follower, a manual control station mounted for movement relative to said bed including a universally movable handle, and means operable by tilting of the handle for applying variable power to the gantry and saddle so as to move the tool head relative to the table in a desired direction with the desired force comprising, a first reversibly rotatable drive member operatively connected to the gantry, a second reversibly rotatable drive member operatively connected to the saddle, pressure responsive drive means associated with each of said drive members, valve means for controlling the pressure operative on the pressure-responsive drive means for applying power to said drive members for the gantry and saddle generally proportional to the pressure, and means in circuit with said valve means for limiting the feed rate of said tool head.

11. A machine tool having a gantry and a saddle each movable in forward and reverse directions and mechanism for moving the gantry and saddle in said directions comprising reversible hydraulically operated drive means associated with each of the gantry and saddle, a control station having a plurality of slidable valve members, a plurality of circuits each connecting a valve member with its associated drive means and effective to exert a pressure on the associated drive means dependent in magnitude on the amount one of the valve members has moved from a neutral position.

12. A router having, in combination, a bed with a work supporting table, a gantry member mounted for movement in a direction paralleling the length of the table and having a saddle way extending transversely above the table, a saddle member slidably mounted on the saddle way for movement generally transversely above the table, a tool head carried on the saddle and adapted to carry a downwardly extending tool, control means including a universally movable control rod, a housing mounted on one of said members, means mounting the rod in the housing for universal movement including a spring mechanism for maintaining the rod in neutral position, a plurality of valve members slidably mounted in the housing and positioned for engagement by said rod there being a pair of valve members for each of the gantry and saddle with one for each direction of movement of the gantry and saddle, and means responsive to movement of certain of the valve members by tilting of the control rod for urging the gantry and saddle in directions to force the tool head in a direction corresponding to the direction of tilt of the control rod.

13. A router having, in combination, a work supporting table, a gantry mounted for movement in a direction paralleling the length of the table and having a saddle way extending transversely above the table, a saddle mounted on the saddle way for movement generally transversely above the table, means with a variable force output for moving the gantry and saddle relative to the table, and control means for the moving means including, a control rod, means movably mounting the control rod on the gantry, said rod having a neutral position, a plurality of valve members positioned for selective operation by said rod, means responsive to movement of at least one of the valve members for controlling the direction of movement of said gantry and saddle and for moving the gantry and saddle with force generally proportional to the amount of movement of the valve members, and means for limiting the feed rate of the gantry and saddle.

14. In a machine tool having a first support, a second support slidable on the first support and adapted to carry a tool, a variable force transmission and control therefor including, a first output shaft operatively connected to said first support, a second output shaft operatively connected to said second support, a pair of drive means associated one with each output shaft for driving the shaft in opposite directions of motion, and means for controlling the output force of each said drive means including a pair of shiftable control members, means connecting the pair of control members to the associated drive means whereby the drive output is proportional to the position of one of the control members, and a control device for shifting a single control member or a pair of control members associated one with each of said drive means to determine the direction of motion and force applied to said output shafts.

15. A machine tool comprising, a worktable adapted to support a workpiece, a first support mounted for movement longitudinally of the table, a second support mounted on the first support for movement generally transverse of the table, a tool head carried on the second support, means having a range of force outputs operatively connected to said supports for exerting a force thereon to move the tool head universally with respect to the table, and manually operable means for selecting the direction and amount of force applied to said supports by said last-mentioned means.

References Cited in the file of this patent

UNITED STATES PATENTS

| | | |
|---|---|---|
| 2,424,031 | Heer | July 15, 1947 |
| 2,610,688 | Overman | Sept. 16, 1952 |
| 2,723,598 | Mann | Nov. 15, 1955 |